United States Patent [19]
Lee

[11] Patent Number: 5,715,302
[45] Date of Patent: Feb. 3, 1998

[54] APPARATUS AND METHOD FOR EXECUTING MODE CONVERSION OF A FACSIMILE SYSTEM INTO AUTOMATIC MODE

[75] Inventor: Chang-Bok Lee, Seoul, Rep. of Korea

[73] Assignee: SamSung Electronics Co., Ltd., Kyungki-do, Rep. of Korea

[21] Appl. No.: 662,469

[22] Filed: Jun. 13, 1996

[30] Foreign Application Priority Data

Jun. 17, 1995 [KR] Rep. of Korea ............... 16173/1995

[51] Int. Cl.$^6$ ............................................. H04M 11/00
[52] U.S. Cl. ............................... 379/100.16; 358/468
[58] Field of Search ................ 379/100.15, 100.01, 379/100.16, 67, 88, 89, 93.09, 93.11; 358/400, 434, 439, 442, 468

[56] References Cited

U.S. PATENT DOCUMENTS

| | | |
|---|---|---|
| 4,584,434 | 4/1986 | Hashimoto . |
| 4,856,053 | 8/1989 | Hashimoto ............... 358/434 |
| 4,868,865 | 9/1989 | Ogawa et al. . |
| 4,901,343 | 2/1990 | Yamagushi . |
| 4,908,851 | 3/1990 | Kotani et al. . |
| 5,086,455 | 2/1992 | Satomi et al. . |
| 5,119,412 | 6/1992 | Attallah . |
| 5,131,026 | 7/1992 | Park . |
| 5,216,706 | 6/1993 | Nakajima . |
| 5,255,311 | 10/1993 | Yoshida . |
| 5,333,179 | 7/1994 | Yamamoto et al. . |
| 5,487,105 | 1/1996 | Sakai . |

FOREIGN PATENT DOCUMENTS 2 166 624   5/1986   United Kingdom .

*Primary Examiner*—Wing F. Chan
*Attorney, Agent, or Firm*—Robert E. Bushnell, Esq.

[57] ABSTRACT

An apparatus and method for automatically converting an operating mode such as a telephone mode, a facsimile mode, a telephone/facsimile mode, and a telephone answer mode of a facsimile system. The apparatus includes an key input unit for allowing a user to set the communication system in an AUTO mode; a noise detector for detecting an ambient noise external to the facsimile system; a switch for enabling transmission of the detected noise level in response to reception of an automatic control signal; and a controller for generating, after the user has set the facsimile system in the AUTO mode, the automatic control signal to receive transmission of the detected noise level, for determining whether a person is present or absent from the vicinity of the communication system by comparing the detected noise level with a reference noise level, and automatically converting an operation mode of the facsimile system from any one of the telephone mode, the facsimile mode, and the telephoned/facsimile mode to the telephone answer mode to respond to an incoming call whether such an incoming call is from a telephone or from another facsimile system.

19 Claims, 3 Drawing Sheets

APPARATUS AND METHOD FOR EXECUTING MODE CONVERSION OF A FACSIMILE SYSTEM INTO AUTOMATIC MODE

CROSS-REFERENCE TO RELATED APPLICATION

This application makes reference to, incorporates the same herein, and claims all benefits accruing under 35 U.S.C. §119 from an application for Apparatus And Method For Executing Mode Conversion Of A Facsimile System Into Automatic Mode filed in the Korean Industrial Property Office on 17 Jun. 1995, and there assigned Ser. No. 16173/1995.

BACKGROUND OF THE INVENTION

1. Technical Field

The present invention relates to an apparatus and method for automatically converting an operating mode of a facsimile system into an automatic telephone answer mode, and more particularly, to an automatic mode conversion apparatus and method capable of automatically converting an operating mode of a facsimile system in dependence upon detection of a noise level surrounding to the facsimile system.

2. Background Art

Generally, a facsimile system having facsimile and telephone functions such as, for example, U.S. Pat. No. 4,908,851 for Facsimile Apparatus Operable In Facsimile Or Conversation Mode issued to Kotani et al., U.S. Pat. No. 5,255,311 for Data Communication Apparatus issued to Yoshida, and U.S. Pat. No. 5,487,105 for Facsimile Apparatus Operable In Facsimile Or Telephone Mode issued to Sakai, is well known in the communication art for selectively operating either in a facsimile mode on in a telephone mode. Many other facsimile systems such as disclosed, for example, in U.S. Pat. No. 5,086,455 for Facsimile Arrangement Having Automatic Answering Telephone Set And Facsimile Set And Switching Process Therefor issued to Satomi et al., U.S. Pat. No. 5,131,026 for Facsimile System Having Auto-Answering Function issued to Park, and U.S. Pat. No. 5,333,179 for Facsimile Apparatus With Automatic Answering Telephone Function issued to Yamamoto et al., are constructed with an automatic telephone answering device for recording a voice message from a calling subscriber when a user is not in the vicinity of the facsimile system to answer an incoming call.

In such a system, the facsimile system and the telephone answering machine must be set manually by the user in an automatic voice answer mode in order to receive both fax and voice messages when the owner is absent. When the facsimile system is set in the automatic voice answer mode, and a call comes in, the telephone answering machine answers and plays the recorded announcement. If the call is from a person, the calling subscriber can leave a message following the normal instructional procedure for the answering machine. If the call is from another facsimile system however, the facsimile system switches over to an automatic reception mode for automatically receiving the document. In this arrangement, if the user neglects or fails to manually set the facsimile system and the telephone answering device in this operating mode however, the facsimile system and the telephone have difficulty in timely performing the image data reception and voice answer functions.

In order to facilitate the image data reception and automatic answer functions, such a facsimile system equipped with a telephone has recently been constructed such as, for example, in U.S. Pat. No. 5,216,706 for Communication Apparatus Having Remote Control Operation Mode issued to Nakajima, to incorporate a remote control operational mode in which respective image data reception and automatic answer functions can be controlled based on a predetermined remote control code transmitted from a remote telephone terminal. Using this construction however, the user must either memorize the remote control code or carry a wallet-sized card containing such remote control code in order to remotely control the functions of the facsimile system. I have found however, that even if the user carries the card containing such a remote control code, there may still be other problems inherently associated with the remote mode conversion operation such as, for example, entry of an incorrect code when the user fails to enter the correct remote control code.

SUMMARY OF THE INVENTION

Accordingly, it is an object of the present invention to provide an improved facsimile system having a telephone handset or speakerphone and process for operation of the system.

It is another object to provide an improved facsimile system and process using a telephone handset capable of automatically changing operationally between an automatic reception mode and a telephone answer mode and thereby efficiently responding to an incoming call regardless of whether the incoming call is from a telephone or another facsimile system.

It is a further an object to provide an improved facsimile system and process using a telephone handset or speakerphone capable of automatically changing operationally between an automatic reception mode and a telephone answer mode in dependence upon a determination of whether a user is present or absent from the vicinity of the facsimile system.

It is a yet further object to provide an improved facsimile system and process using an automatic mode conversion apparatus and method implemented therein to automatically convert into an automatic telephone answer mode when the user is absent from the vicinity of the facsimile system (i.e., when the facsimile system is unattended) in order to fully respond to an incoming call regardless of whether such incoming call is from a telephone or from another facsimile system.

It is also an object to provide an improved facsimile system having an automatic mode conversion apparatus and process implemented therein capable of automatically converting into an automatic reception mode when the user is present in the vicinity of the facsimile system (i.e., when the facsimile system is attended) in order to respond to an incoming call.

These and other objects of the present invention may be achieved with an automatic mode conversion apparatus and process for automatically converting an operating mode such as a telephone mode, a facsimile mode, a telephone/facsimile mode, and a telephone answer mode of a facsimile system. The apparatus includes an key input unit for allowing a user to set the communication system in an AUTO mode; a noise detector for detecting an ambient noise external to the facsimile system; a switch for enabling transmission of the detected noise level in response to reception of an automatic control signal; and a controller for generating, after the user has set the facsimile system in the AUTO mode, the automatic control signal to receive transmission of the detected noise level, for determining whether a person is present or absent from the vicinity of the communication system by comparing the detected noise level with a reference noise level, and automatically converting an operation mode of the facsimile system from any one of the telephone mode, the facsimile mode, and the telephone/facsimile mode to the telephone answer mode to respond to an incoming call whether such an incoming call is from a telephone or from another facsimile system.

The above objects of the present invention may also be achieved with a process for automatically converting an operational mode of a facsimile system which includes the steps of: checking whether an automatic mode key is pressed by a user for setting the facsimile system in an automatic mode, regardless whether the facsimile system has previously been set in one of a telephone mode, a facsimile mode, a telephone/facsimile mode, and a telephone answer mode; generating an automatic mode control signal when the automatic mode key is pressed by the user; detecting a noise level external to the facsimile system and generating a noise detection signal upon reception of the automatic control signal; making a comparison between the noise level obtained from said noise detection signal and a reference noise level to determine whether a person is present or absent from the vicinity of the facsimile system; and activating the automatic mode conversion of the facsimile system when the noise level obtained from said noise detection signal is maintained at a lower level than said reference noise level to automatically convert an operating mode of the facsimile system into the telephone answer mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
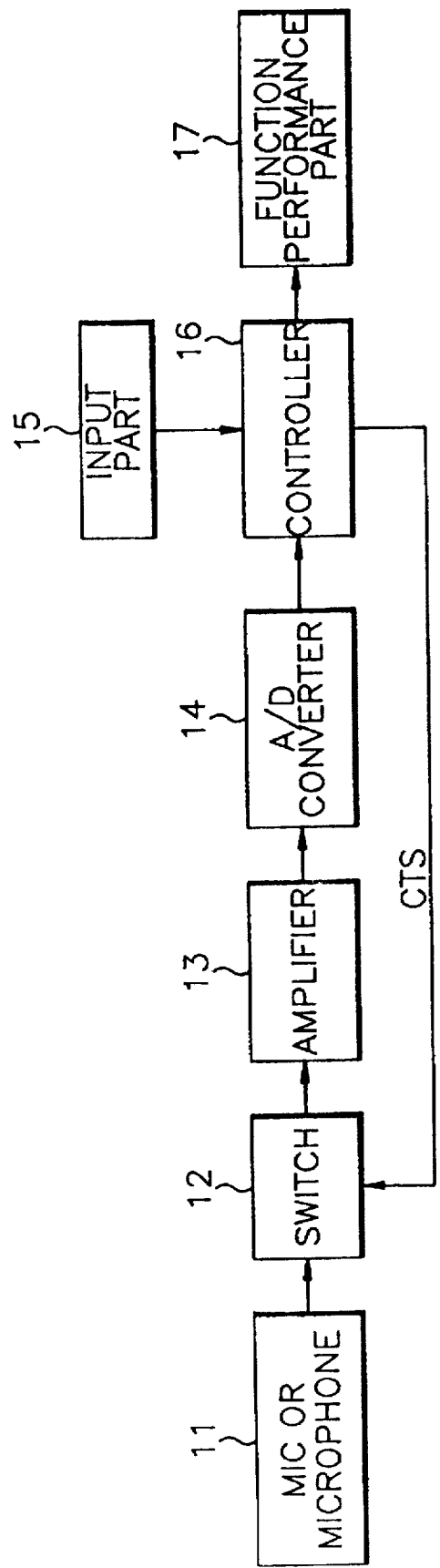
FIG. 1 illustrates an automatic mode conversion apparatus constructed according to the principles of the present invention.

Referring now to the drawings and particularly to FIG. 1, which illustrates an automatic mode conversion apparatus constructed for a facsimile system having a telephone handset constructed according to the principles of the present invention. The facsimile system as contemplated by the present invention has a number of basic modes of reception such as, for example, an automatic reception mode (i.e., a FAX mode) which sets the facsimile system to treat all incoming calls as fax transmissions and to ignore the telephone calls, an manual reception mode (i.e., a TEL mode) which sets the facsimile system to treat all incoming calls from either a telephone or fax as telephone calls and ring every time until the user answers the incoming calls first, an automatic TEL/FAX switch mode (i.e., a TEL/FAX mode) which sets the facsimile system to check all incoming calls to see if they are from a fax or telephone. If the call is from another fax, the facsimile system receives the document without ringing. If the call is from a telephone, the facsimile system rings to alert the user to pick up the handset and to answer the call. A telephone answer mode (i.e., an ANS mode) is also contemplated to receive all fax transmissions as well as telephone messages. That is, when a call comes in, the answering machine answers and plays the recorded announcement. If the call is from a person, the calling subscriber can leave a voice message following the normal procedure for the answering machine. If the call is from another fax however, the facsimile system automatically switches over to the automatic reception mode after a predetermined time period in order to receive the document in a timely fashion. The automatic mode conversion apparatus constructed according to the principles of the present invention is intended primarily for the facsimile system to automatically switch an operating mode to an automatic telephone answer mode, when the user fails to manually set the facsimile system in such an operating mode while the facsimile system is unattended. The automatic mode conversion scheme according to the present invention is validated based upon a determination of whether the facsimile system is left unattended, that is, whether the user is present or absent from the vicinity of the facsimile system to answer an incoming call.

Referring back to FIG. 1, the automatic mode conversion apparatus constructed according to the principles of the present invention includes a microphone 11, a switch 12, an amplifier 13, an A/D converter 14, a controller 16, a function performance unit 17, and a key input unit 15 which can be integrated as part of an operating panel OPE of the facsimile system containing an automatic mode key for allowing the user to set the facsimile system in an automatic operating mode, hereinafter referred to as an "AUTO" mode which initially maintains the facsimile system in any one of the four modes previously set by the user such as, for example, the manual reception mode (i.e, TEL mode), the automatic reception mode (i.e., FAX mode), the automatic TEL/FAX switch over mode (i.e., TEL/FAX mode), and the automatic telephone answer mode (i.e., ANS mode), but subsequently converts the facsimile system into the automatic telephone answer mode in response to determination of whether a person is present or absent from the vicinity of the facsimile system. That is, once the AUTO mode is set by the user, the facsimile system automatically converts an operating mode such as, for example, from either the automatic reception mode, the manual reception mode and the automatic TEL/FAX switch over mode to an automatic telephone answer mode, in response to determination of whether any person including the user is present or absent from the vicinity of the facsimile system by detecting the level of ambient or peripheral noise external to the facsimile system in order to correctly respond to an incoming call whether such an incoming call is from a telephone or from another facsimile system regardless of whether that user is absent from the vicinity of the facsimile system.

As an ambient noise detector, microphone 11 determines whether the user is present or absent from the vicinity of the facsimile system by detecting the level of ambient or peripheral noise external to the facsimile system, converts such a noise level into an electric signal. Switch 12 as connected to an output terminal of microphone 11 is turned on when it receives an automatic control signal CTS in order to form a transmission path for the detected noise signal. Amplifier 13 amplifies the noise signal transmitted through switch 12 and outputs an amplified signal. The A/D converter 14 then converts the noise signal amplified in amplifier 13 into noise data of a digital type. The controller 16 has two functions: the first function is to apply the automatic control signal CTS to switch 12 when an automatic mode key signal is generated by key input unit 15. The second function is to receive the noise level transmitted through switch 12 for comparison with a reference noise level. Based on this comparison, controller 16 determines whether a user is present or absent from the vicinity of the facsimile system in order to respond to an incoming call regardless of whether such an incoming call is from a telephone or another facsimile system. That is, if the ambient noise level is determined to be lower than the reference noise level during a predetermined time period, controller 16 activates function performance unit 17 to convert an automatic operating mode of the facsimile system into an automatic telephone answer mode. If, on the other hand, the ambient noise level is determined as higher than the reference noise level during the predetermined time period, the controller 16 controls the function performance unit 17 to convert the automatic operating mode of the facsimile system into an automatic reception mode.

As established above, when the user presses the automatic mode key through the key input unit 15, the controller 16 sets the facsimile system in an automatic control mode and then generates the automatic control signal CTS. After the automatic control signal CTS is generated by the controller 16, the switch 12 is tamed on to form a transmission path between the microphone 11 and the amplifier 13. At the moment, the microphone 11 detects the level of ambient noise around the facsimile system and converts the noise level into an electric signal having an amplitude proportional to that of the noise. The amplifier 13 amplifies the detected noise signal and the A/D converter 14 converts the amplified noise signal into the digital noise data.

The controller 16 as established to the automatic control mode compares the detected noise level with a reference noise level in order to execute the mode conversion of the facsimile system into the automatic answer mode when the detected noise level is determined as being lower than the reference noise level for a predetermined time period. If the detected noise level is determined however to be higher than the reference noise level while the facsimile system is set in the automatic control mode, the automatic control mode is released and controller 16 executes the mode conversion of the facsimile system into an original mode which is an operating mode of the facsimile system previously set by the user before the automatic mode key was pressed.

Figure 2:
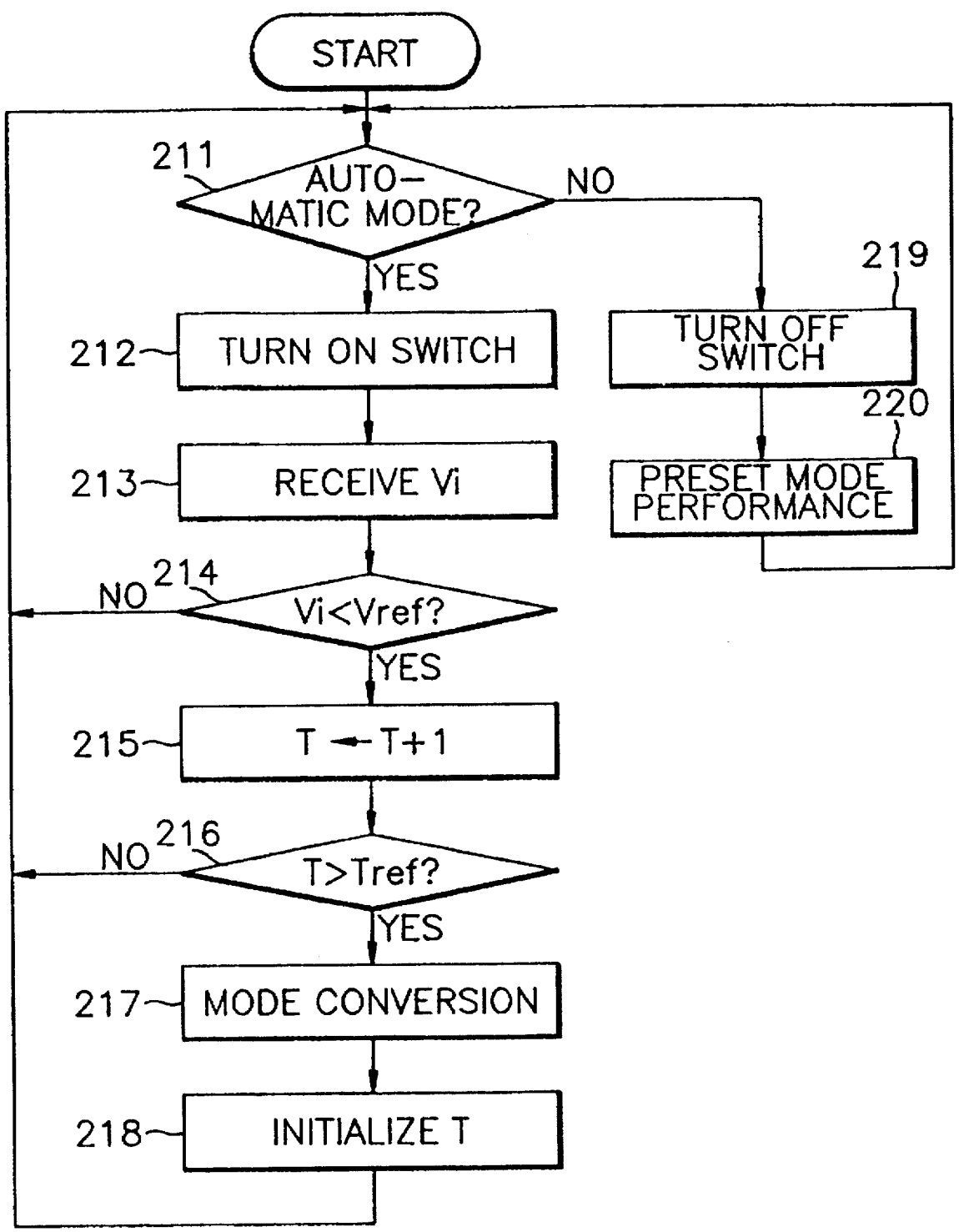
FIG. 2 is a flowchart illustrating an automatic mode conversion of the automatic mode conversion apparatus for enabling a facsimile system to operate in one of an automatic reception mode and an automatic answer mode in dependence upon a determination of whether a user is present or absent from the vicinity of the facsimile system by monitoring the ambient noise level external to the facsimile system.

FIG. 2 is a flowchart illustrating an automatic mode conversion of the automatic mode conversion apparatus of FIG. 1 for enabling a facsimile system to operate in one of an automatic reception mode and an automatic answer mode in dependence upon a determination of whether a user is present or absent from the vicinity of the facsimile system by monitoring the ambient noise level external to the facsimile system. As shown in FIG. 2, Vi is the noise value, Vref is he reference value T is the period of time during which the noise value is detected to be less than the reference value Vref, and Tref is a reference period of time. Referring to FIGS. 1 and 2, if the automatic mode key is pressed by the user at the key input unit 15, the controller 16 senses the automatic mode key signal at step 211 and generates an automatic control signal CTS in order to turn on switch 12 at step 212. Once the switch 12 is turned on, the noise level Vi as continuously monitored and detected by microphone 11, is transmitted to controller 16 through the amplifier 13 and the A/D converter 14. Upon reception of the detected noise level Vi at step 213, the controller 16 compares the detected noise level Vi with the reference noise level Vref according to a count period at step 214 in order to determine whether the detected noise level Vi is higher or lower than the reference noise level Vref. If the detected noise level Vi is determined to be higher than the reference noise level Vref at step 214, the controller 16 returns to step 211 and then enters a stand-by state for reception of the next noise level Vi. That is, when the detected noise level Vi is higher than the reference noise level Vref, the controller 16 determines that some person, the user, perhaps is present in the vicinity of the facsimile system and converts the operating mode of the facsimile system back to an original mode which is an operating mode of the facsimile system previously set by the user before the automatic mode key was pressed.

By contrast, if the detected noise level Vi is determined as being lower than the reference noise level Vref at step 214, the controller 16 increases a count value to thereby increase the time T at step 215. After the increment of the count value, controller 16 compares the value of time T with a reference time Tref at step 216 in order to confirm that the detected noise level Vi is in fact lower than the reference noise level Vref If the value of time T is shorter than the reference time Tref, that is, the detected noise level Vi fails to maintain lower than the reference noise level during a predetermined time period, controller 16 returns to step 211 and enters in a stand-by state for reception of the next noise level Vi. In other words, controller 16 determines that the user is still in the vicinity of the facsimile system and converts the operating mode of the facsimile system back to an original mode which was the operating mode of the facsimile system previously set by the user before the automatic mode key was pressed.

If the value of time T is longer than the reference time Tref however i.e., if the detected noise level Vi is maintained lower than the reference noise level Vref for a predetermined time period at step 216, controller 16 executes the mode conversion of the facsimile system into an automatic answer mode at step 217, initializes the value of time T at step 218 and returns to step 211.

Moreover, if the automatic control mode is not established by the user at step 211, controller 16 turns off the switch 12 at step 219 to block the transmission path from the microphone 11 in order to allow the facsimile system to operate in any operating mode previously established by the user at step 220.

Accordingly, as established above, if the automatic control mode is designated in communication system such as a facsimile system to execute the automatic operating mode and the general operating mode, the size of the ambient noise is analyzed. Then, if the noise level is detected as being below the value of a reference noise level for a given time, the operation of the communication system is automatically convened into an automatic performance mode such as, for example, an automatic telephone answer mode as disclosed in the discussion of the preferred embodiment of the present invention.

Figure 3:
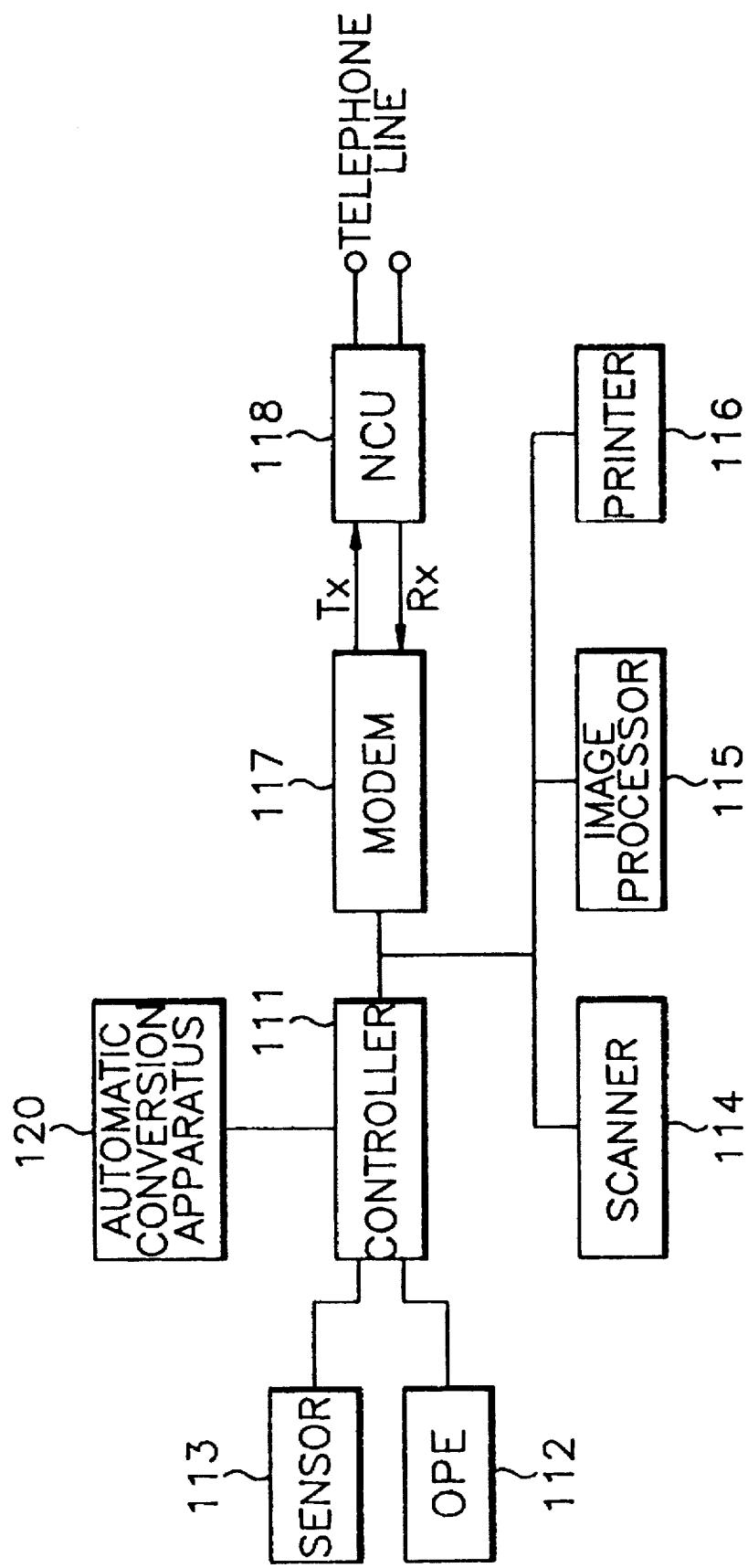
FIG. 3 illustrates an automatic mode conversion apparatus constructed in a facsimile system according to the principles of the present invention.

Turn now to FIG. 3, which illustrates a facsimile system having an automatic mode conversion apparatus constructed according to the principles of the present invention. The facsimile system contemplates a control unit 111 for controlling operations of the facsimile system, an operational panel OPE 112, a sensor 113, a scanner 114, an image processor 11, a printer 116, a modem 117, a network control unit NCU 118, a telephone handset (not shown), and an automatic mode conversion apparatus 120.

The controller 111 contains a program memory such as a ROM (not shown) which stores programs for controlling the general operation of the facsimile system in either one of a transmission mode, a reception mode and a copy mode, and a data memory such as a RAM (not shown) which temporarily stores various items of information. The controller 111 of FIG. 3 can be the same controller as shown in FIG. 1. A program for performing an automatic mode conversion of a facsimile system as contemplated by the present invention may be stored in the program memory. The operational panel (OPE) 112 uses a key input unit and a display unit. The key input unit of the operational panel 112 may be the same key input unit 15 of the automatic mode conversion apparatus as shown in FIG. 1, and generates key data to the controller 111, when pressed by the user for designating different mode of operation and the operation of the designated mode. Further, when the facsimile system is operating in a designated mode of operation such as, for example, a transmission mode, a reception mode and a copy mode, the display unit of the operational panel 112 displays data indicative of the designated mode of operation of the facsimile system while performing each mode of operation. The sensor 113 senses whether a document is input into the facsimile system, or whether copy paper is stored and available for use, and generates an indicative signal to the controller 111. The scanner 114 transports and scans an image of the input document and then generates image data corresponding to the scanned image. The image processor 115 processes the image data output from the scanner 114 in order to generate processed image data for either transmission via a telephone line or copy during the copy mode under control of the controller 111, and processes the image signal received from the telephone line during the reception mode. The printer 116 prints the image data received from the image processor 115 on a printable medium such as individual cut sheets of papers during the reception mode and the copy mode under the control of the controller 111. The modem 117 modulates the image data output from the image processor 115 into a modulated image signal for transmission, and duplicates the image signal input to the image processor 115 during the reception mode under the control of the controller 111. The network control unit (NCU) 118 is connected with the telephone line to form transmission and reception paths for the modem 117 under the control of the controller 111. An automatic mode conversion apparatus 120 detects the ambient noise external of the facsimile system under control of the controller 111 and outputs the detected noise level to the controller 111 for executing the automatic mode conversion.

The operation of the controller 111 is set similarly to that of the controller 16 of FIG. 1. Accordingly, if the automatic control key is pressed through the key input unit of the operating panel 112 formed on a surface of the facsimile system, the controller 111 forms a transmission path of the noise signal detected by controlling the operation of the switch 12 of the automatic conversion apparatus 120. Moreover, the controller 111 compares the detected noise level Vi with a reference noise level Vref in order to determine whether the user is present or absent from the vicinity of the facsimile system. If the detected noise level is determined to be lower than the reference noise level for a predetermined time period, the controller 111 automatically converts an operating mode of the facsimile system into an automatic telephone answer mode for responding to an incoming call regardless of whether such an incoming call is from a telephone or another facsimile system.

As established above, whenever an AUTO mode of the facsimile system is set by the user, the facsimile system analyzes the size of the ambient noise surrounding the facsimile system in order to determine whether a person or the user is present or absent from the vicinity of the facsimile system to respond to an incoming call. If the detected noise level Vi is greater than the reference noise level Vref, which indicates that the user is present in the vicinity of the facsimile system, the controller automatically converts an operating mode of the facsimile system back to an original operating mode. For example, if the original operating mode of the facsimile system before entry of the automatic control mode is set in an automatic reception mode (i.e., FAX mode), the operating mode of the facsimile system will return to the FAX mode when the facsimile system determines that the user is present in its vicinity. Similarly, if the original operating mode of the facsimile system is previously set in a manual reception mode (i.e., TEL mode) or an automatic TEL/FAX switch over mode (i.e., TEL/FAX mode), the operating mode of the facsimile system will return to either the TEL mode or the TEL/FAX mode when the facsimile system determines that the user is present in its vicinity. If the detected noise level Vi is however lower than the reference noise level Vref for a predetermined time period which indicates that the user is absent from the vicinity of the facsimile system, the controller automatically converts an operating mode of the facsimile system into an automatic telephone answer mode (i.e., ANS mode) in order to effectively respond to an incoming call regardless of whether such an incoming call is from a telephone or from another facsimile system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for automatically converting an operating mode in a communication system, said communication system being operable in a telephone mode, a facsimile mode, a telephone/facsimile mode, and a telephone answer mode, said apparatus comprising:

input means for allowing a user to set the communication system in an automatic mode;

means for detecting an ambient noise external to the communication system and generating a noise detection signal;

switch means for enabling transmission of said noise detection signal in response to reception of an automatic control signal; and control means for generating, after the user has set the communication system in said automatic mode, said automatic control signal to receive transmission of said noise detection signal, for making a comparison between said noise detection signal and a reference noise signal to determine whether a person is present or absent from the vicinity of the communication system, and for automatically converting an operational mode of the communication system from any one of said telephone mode, said facsimile mode, and said telephone/facsimile mode to said telephone answer mode in dependence upon said comparison.

2. The apparatus of claim 1, further comprised of said means for detecting the ambient noise external to the communication system comprising a microphone.

3. The apparatus of claim 1, further comprising:
   amplifier means for amplifying the noise detection signal; and
   converter means for converting the noise detection signal into a digital form after amplification and before transmission to said control means.

4. The apparatus of claim 1, further comprised of said control means determining that the person is present in the vicinity of the communication system when said noise detection signal exhibits a noise level greater than a reference level of said reference noise signal, and automatically converting the operational mode of the communication system back to any one of said telephone mode, said facsimile mode, and said telephone/facsimile mode previously set by the user.

5. The apparatus of claim 4, further comprised of said control means determining that the person is absent from the vicinity of the communication system when said noise detection signal exhibits a noise level lower than said reference level for a predetermined duration, and converting the operational mode of the communication system from any one of said telephone mode, said facsimile mode, and said telephone/facsimile mode previously set by the user to said telephone answer mode.

6. The apparatus of claim 1, further comprised of said control means determining that the person is present in the vicinity of the communication system when said noise detection signal exhibits a noise level greater than a reference level of said reference noise signal, and releasing said automatic mode of the communication system to return to any one of said telephone mode, said facsimile mode, said telephone/facsimile mode, and said telephone answer mode previously set by the user manually.

7. The apparatus of claim 6, further comprised of said control means determining that the person is absent from the vicinity of the communication system when said noise detection signal exhibits a noise level lower than said reference level for a predetermined duration, and automatically switching the operational mode of the communication system from any one of said telephone mode, said facsimile mode, and said telephone/facsimile mode previously set by the user to said telephone answer mode.

8. An apparatus for automatically converting an operation mode in a facsimile system, comprising:
   input means having an automatic mode key for enabling a user to set the facsimile system in an automatic mode, regardless whether the facsimile system has been operating in one of a telephone mode, a facsimile mode, a telephone/facsimile mode, and a telephone answer mode previously set by the user;
   noise detector means for detecting a level of ambient noise external to said communication system and generating a noise detection signal;
   switch means for enabling transmission of said noise detection signal in response to reception of an automatic control signal; and
   control means for generating, after the user has set the facsimile system in said automatic mode, said automatic control signal for receiving said noise detection signal to determine whether said noise detection signal exhibits the noise level greater than a reference noise level, and for activating the automatic mode conversion of the facsimile system when said noise detection signal exhibits the noise level less than said reference noise level.

9. The apparatus of claim 8, further comprised of said noise detector means comprising a microphone.

10. The apparatus of claim 8, further comprising:
    amplifier means for amplifying the noise detection signal; and
    converter means for converting the noise detection signal into a digital form after amplification and before transmission to said control means.

11. The apparatus of claim 8, further comprised of said control means determining that a person is present in the vicinity of the facsimile system when said noise detection signal exhibits the noise level greater than said reference noise level, and automatically releasing said automatic mode of the facsimile system to return to an operating mode from any one of said telephone mode, said facsimile mode, said telephone/facsimile mode previously set by the user.

12. The apparatus of claim 8, further comprised of said control means determining that a person is absent from the vicinity of the facsimile system when said noise detection signal exhibits the noise level lower than said reference noise level for a predetermined duration, and automatically converting an operating mode of the facsimile system into said telephone answer mode.

13. The apparatus of claim 8, further comprised of said control means determining that the person is absent from the vicinity of the facsimile system when said noise detection signal exhibits the noise level lower than said reference noise level for a predetermined duration, and automatically switching an operation mode of the facsimile system from any one of said telephone mode, said facsimile mode, and said telephone/facsimile mode previously set by the user to said telephone answer mode.

14. A method for automatically converting an operation mode of a facsimile system having an operational panel with an automatic mode key, comprising the steps of:
    checking whether the automatic mode key is pressed by a user for setting the facsimile system in an automatic mode, regardless whether the facsimile system has previously been set in one of a telephone mode, a facsimile mode, a telephone/facsimile mode, and a telephone answer mode;
    generating an automatic mode control signal when the automatic mode key is pressed by the user;
    detecting a noise level external to the facsimile system and generating a noise detection signal upon reception of said automatic control signal;
    making a comparison between the noise level obtained from said noise detection signal and a reference noise level to determine whether a person is present or absent from the vicinity of the facsimile system; and
    activating the automatic mode conversion of the facsimile system when the noise level obtained from said noise detection signal is maintained at a lower level than said reference noise level to automatically convert an operating mode of the facsimile system into the telephone answer mode.

15. The method of claim 14, wherein the noise level external to the facsimile system is detected by a microphone.

16. The method of claim 14, further comprised of determining that the person is present in the vicinity of the facsimile system when the noise level obtained from said noise detection signal is greater than said reference noise level, and activating the automatic mode conversion of the facsimile system to return to an operating mode from any one of said telephone mode, said facsimile mode, said telephone/facsimile mode previously set by the user.

17. The method of claim 14, further comprised of determining that the person is absent from the vicinity of the facsimile system when the noise level obtained from said noise detection signal is maintained lower than said reference noise level for a predetermined duration, and activating the automatic mode conversion to convert an operating mode of the facsimile system into said telephone answer mode.

18. The method for automatically converting an operating mode in a facsimile system operable in a telephone mode, a facsimile mode, a telephone/facsimile mode, and a telephone answer mode, said method comprising the steps of:

generating an automatic control signal when a user sets the facsimile system in an automatic mode;

detecting a noise level surrounding the facsimile system and generating a noise detection signal in response to reception of said automatic control signal;

making a comparison between the noise level obtained from said noise detection signal and a reference noise level to determine whether a person is present or absent from the vicinity of the facsimile system;

releasing said automatic mode of the facsimile system to return to an operating mode of any one of said telephone mode, said facsimile mode, said telephone/facsimile mode previously set by the user, when the noise level obtained from said noise detection signal is greater than said reference noise level indicating that the person is present in the vicinity of the facsimile system; and automatically converting an operating mode of the facsimile system into said telephone answer mode, when the noise level obtained from said noise detection signal is maintained lower than said reference noise level for a predetermined duration indicating that the person is absent in the vicinity of the facsimile system.

19. The method of claim 18, wherein the noise level external to the facsimile system is detected by a microphone.

* * * * *